United States Patent [19]

Kovach

[11] Patent Number: 5,121,776
[45] Date of Patent: Jun. 16, 1992

[54] OIL DRAIN BAG

[76] Inventor: Christopher D. Kovach, 6039 Sunset Ridge Ct., Centreville, Va. 22020

[21] Appl. No.: 657,417

[22] Filed: Feb. 19, 1991

[51] Int. Cl.$^5$ ............................................. F16N 31/00
[52] U.S. Cl. ...................................... 141/98; 141/97; 141/114; 141/314; 141/383; 141/DIG. 1; 184/1.5; 206/818; 206/829; 383/11; 383/41
[58] Field of Search ...................... 141/331-334, 141/337-342, 98, 311 A, 312, 10, 313-317, 114, 346, 379-381, 372, 383, 391, 392, 97, DIG. 1; 184/1.5, 105.1, 106; 220/571, 573, 86.1, 86.2; 206/223, 829, 806, 818; 383/11, 41, 67; 312/1; 248/206.5, 206.3

[56] References Cited

U.S. PATENT DOCUMENTS

| | | | |
|---|---|---|---|
| 385,256 | 6/1888 | Eggers | 383/41 X |
| 2,739,632 | 3/1956 | Rodriguez | 383/11 |
| 3,395,957 | 8/1968 | Peele | 312/1 |
| 3,543,719 | 12/1970 | Pettyjohn | 141/383 X |
| 3,858,418 | 1/1975 | Butler | 312/1 X |
| 3,874,478 | 4/1975 | Mantell, Jr. | 184/1.5 |
| 3,892,369 | 7/1975 | Fujawa | 206/829 |
| 4,485,853 | 12/1984 | Gunderson | 141/97 X |
| 4,695,088 | 9/1987 | Jensen | 184/106 X |
| 4,756,349 | 7/1988 | Atkins | 141/383 |
| 4,911,191 | 3/1990 | Bain | 312/1 X |

Primary Examiner—Henry J. Recla
Assistant Examiner—Casey Jacyna
Attorney, Agent, or Firm—Leon Gilden

[57] ABSTRACT

An organization wherein a flexible bag includes a upwardly extending neck formed with a mounting means in circumferential surrounding relationship relative to an upper opening of the bag for securement to a bottom surface of a crank case drain pan. The bag structure includes a mounting ring for receiving the drain plug from the crank case, as well as a valve tube and associated valve plug to direct fluid from the bag structure subsequent to a draining procedure. Modifications of the bag structure include a glove bag pouch directed within a side wall of the neck for receiving an individual's hand for permitting replacement of the crank case drain plug.

3 Claims, 4 Drawing Sheets

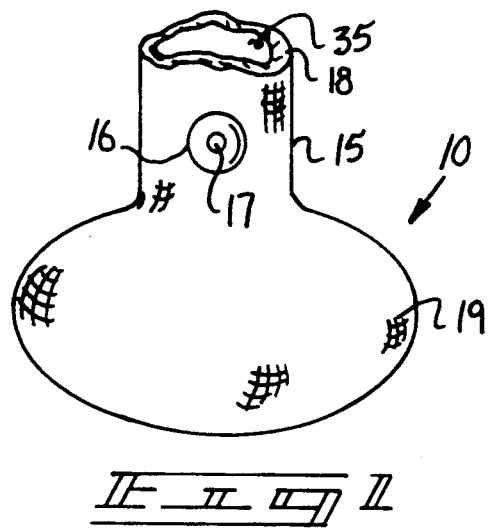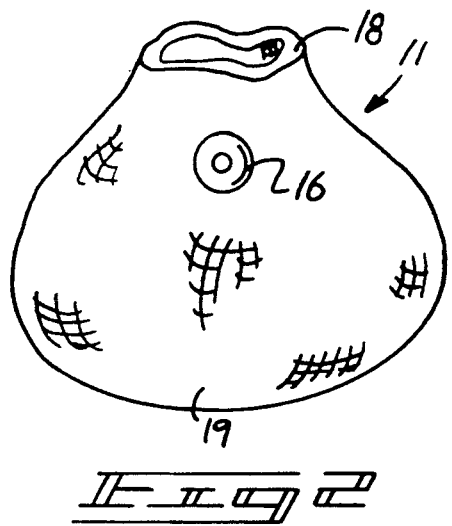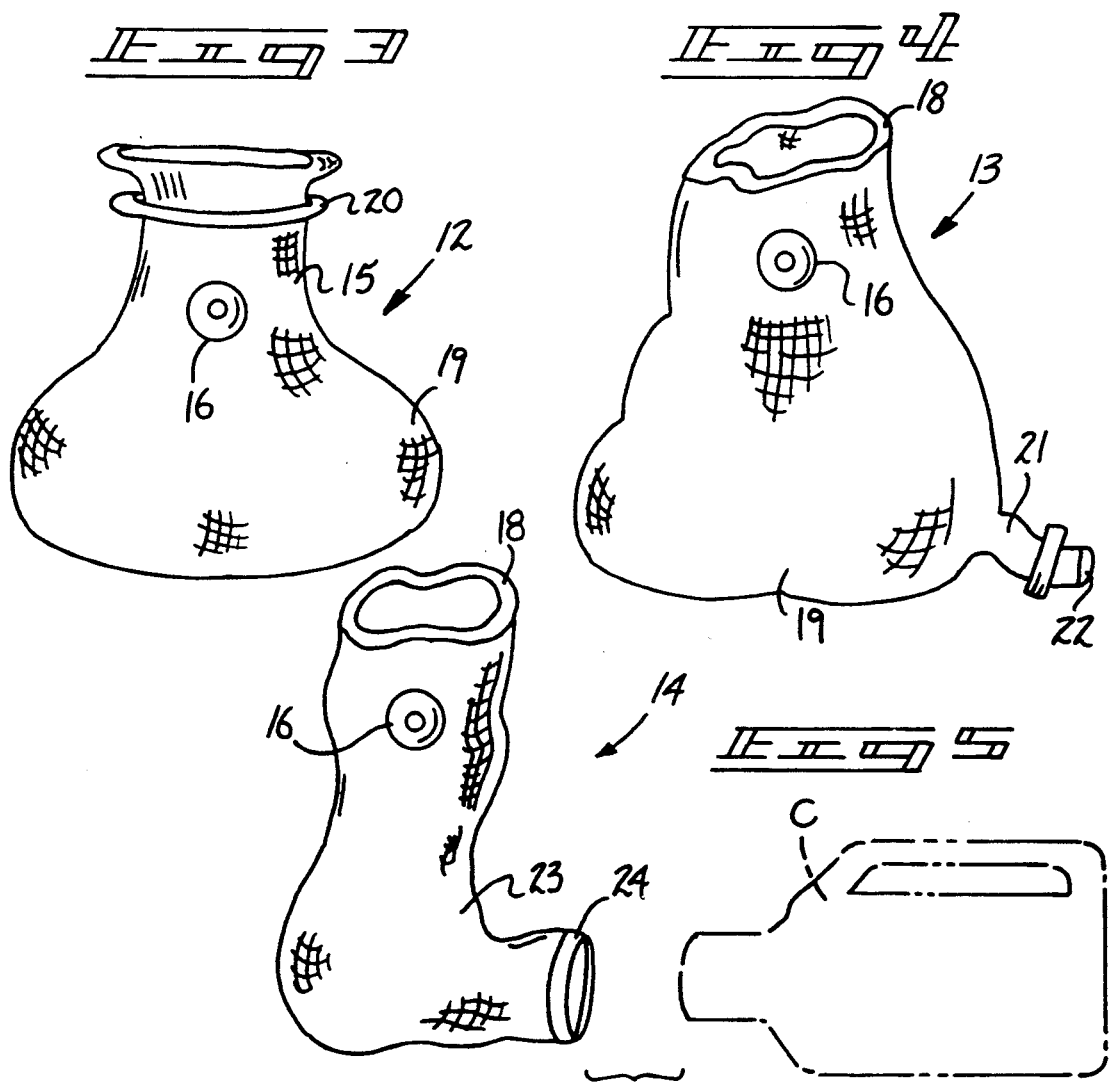

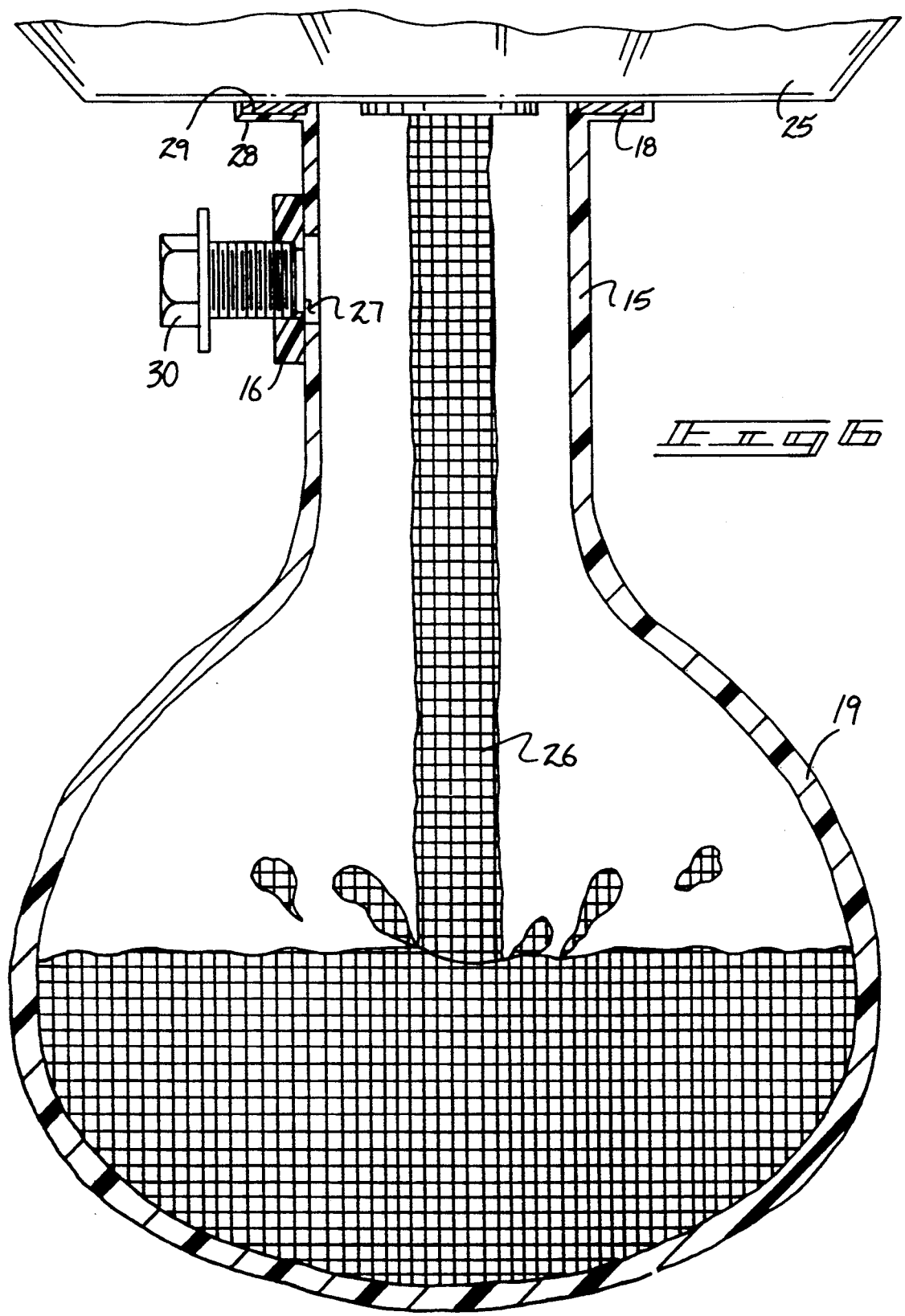

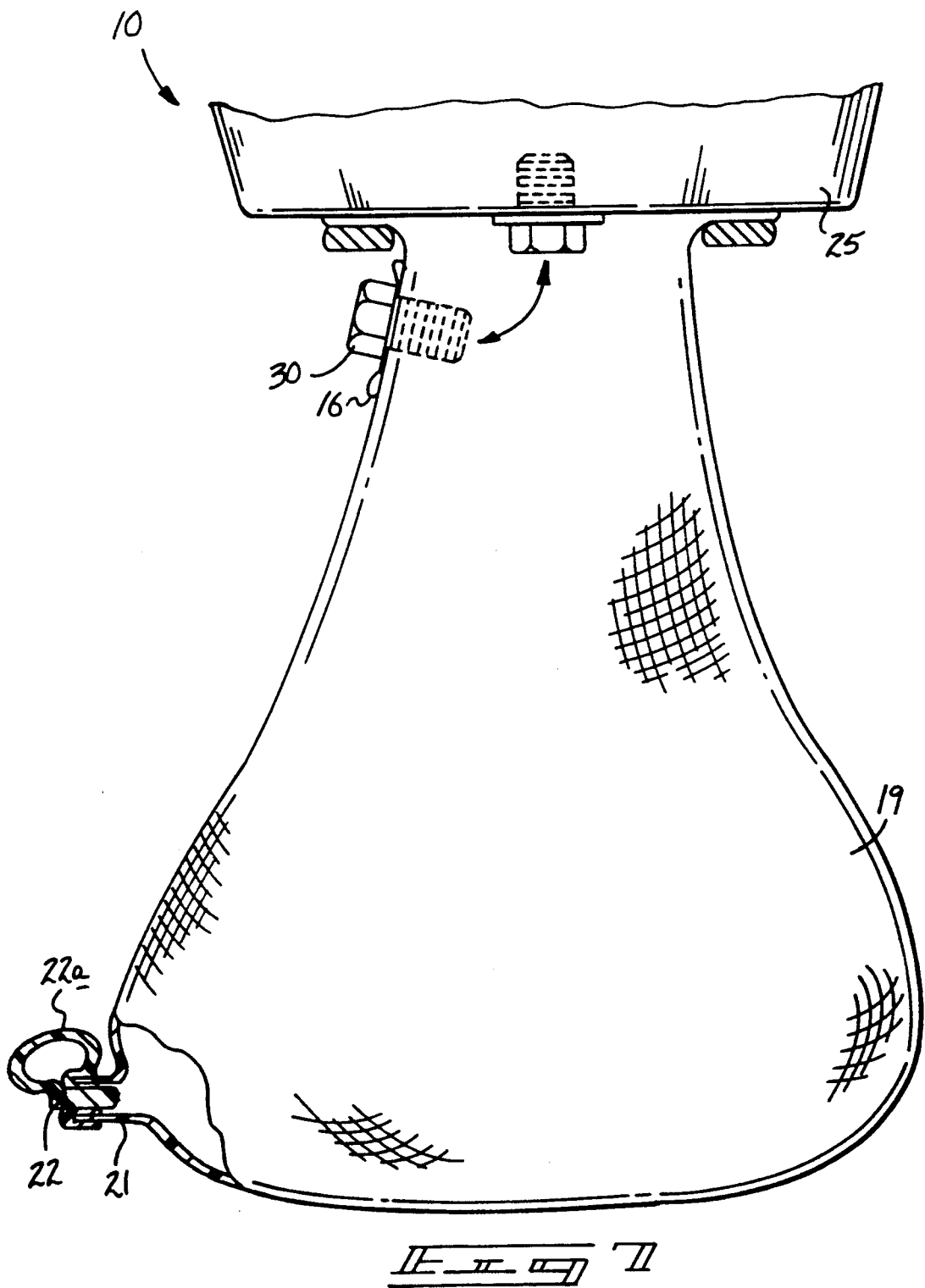

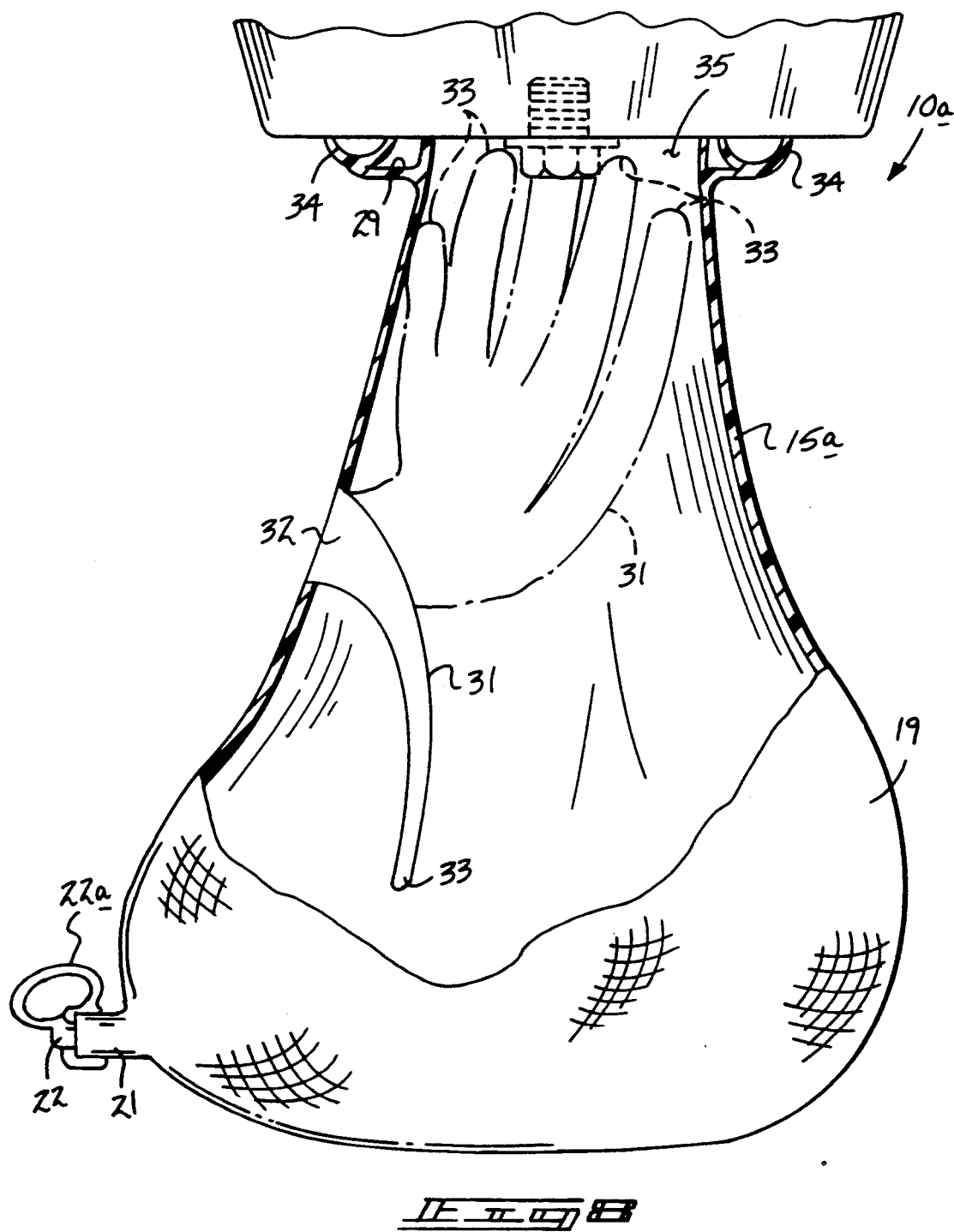

OIL DRAIN BAG

BACKGROUND OF THE INVENTION

1. Field of the Invention

The field of invention relates to oil drain apparatus, and more particularly pertains to a new and improved oil drain bag wherein the same is arranged for the reception and convenient disposal of crank case oil of an internal combustion engine.

2. Description of the Prior Art

Various fluid containing bag structure is provided in the prior art for receiving oil type fluid for permitting disposal. Such bag structure is not only convenient but necessary in environmentally separating oil for disposal at a proper relationship relative to a crank case draining. Examples of the prior art include U.S. Pat. No. 4,283,032 to Smith wherein a bag structure utilizes a wire member to position the bag opening relative to the crank case.

U.S. Pat. No. 4,592,448 to Morris sets forth an oil pan receptacle utilizing hook and loop fasterners for securement of the bag structure to the crank case.

U.S. Pat. No. 3,874,478 to Mantell, Jr. sets forth a crank case drain valve, wherein a bag structure is mounted relative to a fitting of the crank case, wherein the bag structure utilizes an elastomeric loop for securement of the bag relative to the crank case.

U.S. Pat. No. 4,022,257 to O'Connell sets forth a drain receptacle utilizing an outlet opening for securement to a bag for disposal of the fluid directed within the container.

As such, it may be appreciated that there continues to be a need for a new and improved oil drain bag as set forth by the instant invention which addresses both the problem of ease of use as well as effectiveness in construction and in this respect, the present invention substantially fulfills this need.

SUMMARY OF THE INVENTION

In view off the foregoing disadvantages inherent in the known types of fluid drainage containers now present in the prior art, the present invention provides an oil drain bag wherein the same is arranged for mounting to a bottom surface of a crank case of an internal combustion engine for receiving crank case fluid therefrom. As such, the general purpose of the present invention, which will be described subsequently in greater details, is to provide a new and improved oil drain bag which has all the advantages of the prior art drain bag containers and none of the advantages.

To attain this, the present invention provides an organization wherein a flexible bag includes an upwardly extending neck formed with a mounting means in circumferential surrounding relationship relative to an upper opening of the bag for securement to a bottom surface of a crank case drain pan. The bag structure includes a mounting ring for receiving the drain plug from the crank case, as well as a valve tube and associated valve plug to direct fluid from the bag structure subsequent to a draining procedure. Modifications of the bag structure include a glove bag pouch directed within a side wall of the neck for receiving an individual's hand for permitting replacement of the crank case drain plug.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of the other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved oil drain bag which has all the advantages of the prior art oil drain containers and none of the disadvantages.

It is another object of the present invention to provide a new and improved oil drain bag which may be easily and efficiently manufactured and marketed.

It is a further object of the present invention to provide a new and improved oil drain bag which is of a durable and reliable construction.

An even further object of the present invention is to provide a new and improved oil drain bag which is susceptible of a low cost of manufacture with regard to both materials and labor, and which accordingly is then susceptible of low prices of sale to the consuming public, thereby making such oil drain bags economically available to the buying public.

Still yet another object of the present invention is to provide a new and improved oil drain bag which provides in the apparatuses and methods of the prior art some of the advantages thereof, while simultaneously overcoming some of the disadvantages normally associated therewith.

Still another object of the present invention is to provide a new and improved oil drain bag wherein the same is arrange for convenient mounting to a bottom surface of a crank case housing for receiving drainage and waste oil therefrom in a convenient and environmentally safe manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of an oil drain bag utilized by the instant invention.

FIG. 2 is an isometric illustration of a further drain bag utilized by the instant invention.

FIG. 3 is an isometric illustration of a yet further oil drain bag configuration utilized by the instant invention.

FIG. 4 is an isometric illustration of an even further oil drain bag structure utilized by the instant invention.

FIG. 5 is an isometric illustration of the oil drain bag modification in association with a drain storage container.

FIG. 6 is ab orthographic cross-sectional view of the oil drain bag of the instant invention.

FIG. 7 is an orthographic side view, taken in elevation, of the oil drain bag mounted to a bottom surface of a crank case housing.

FIG. 8 is an orthographic view, partially in section, of a modified drain bag structure of the instant invention utilizing a glove bag pouch directed through a side wall of the neck of the container.

DESCRIPTION OF THE PREFERRED EMBODIMENT

With reference now to the drawings, and in particular to FIGS. 1 to 8 thereof, a new and improved oil drain bag embodying the principles and concepts of the present invention and generally designated by the reference numeral 10 will be described.

More specifically, the oil drain bag apparatus 10 of the instant invention essentially comprises an elongate neck 15, including a magnetic ring 18 integral with and mounted to an upper terminal end of the neck 15. By contrast, FIG. 3 illustrates a third drain bag structure 12, wherein a removable torroidal magnetic ring 20 is removably mounted about the neck to permit disposal of the third bag structure 12, as opposed to reusable containers typically formed of a heavier gauge material. The second oil drain bag structure 11 is formed without an elongate neck, wherein the fourth drain bag structure formed without a neck includes a valve tube 21 and associated valve plug 22 used typically throughout the bags to permit bottom draining of the bag structures when the bags are for reuse. The fifth drain bag organization 14, as illustrated in FIG. 5, is of a generally "L" shaped body 23 whose lower leg is formed with elastomeric lower oulet band 24 for securement about an associated container "C" to permit drainage of the fluid within the bag structure into the container for subsequent removal of drainage fluid within the bag structure into the container.

Each of the bag structures includes a mounting ring 16 of a generally torroidal configuration formed with a central opening 17 coaxially aligned with a bag opening 27. The mounting ring opening 17 is defined by a first diameter less than a second diameter defined by the bag opening 27 to provide a press-fit constriction of an associated crank case drain plug member 30 that is mounted therewith for temporary storage of the plug member 30 during a draining procedure, such as illustrated in FIGS. 6 and 7 for example. Each elongate neck 15 is formed with a neck opening 35, wherein the bag structure 10, as illustrated in FIGS. 6 and 7, includes a magnetic ring 18 integral with an upper terminal end of the neck 15 and typically positioned and mounted within a bag flange 28 that extends outwardly of the neck opening 35 and includes a channel 29 to fixedly receive the torroidal magnetic ring 18 therewithin for selective securement to a bottom surface of an associated metallic crank case container 25, as typically utilized with internal combustion engines. The flexible bag body 19 accordingly receives the crank case oil 26 therewithin when the plug 30 is removed relative to the crank case container 25, such as illustrated in FIG. 7. The valve tube 21 formed within the bag body 19 is positioned adjacent the lower terminal end of the bag body 19 and includes a valve plug 22 removably mounted within the valve tube 21 at an outer terminal end thereof, including a valve plug tether 22a formed of a flexible material mounting the valve plug 22 to the valve tube 21.

A modified oil drain bag 10a includes a modified neck structure 15a that is formed with a glove bag pouch 31 directed interiorly of the neck 15a and the bag body 19, wherein the glove bag pouch 31 is directed of the bag through a glove bag access opening 32. The glove bag pouch 31 also includes a multi-bag lower end 33, wherein each of the multiple bags 33 receives respective fingers of an individual's hand to permit manual grasping for removal and replacement of the crank case drain plug member 30 permitting contact by an individual to the associated crank case oil 26.

Further, the modified neck 15a may employ suction cup member 34 in an annular array about the neck opening 35 as an alternative to the magnetic ring structure 18 for securement to the bottom surface of the crank case container 25. The suction cup members 34 are accordingly mounted within the bag flange channel 29 in lieu of the magnetic member 18.

As to the manner of usage and operation of the instant invention, the same should be apparent from the above disclosure, and accordingly no further discussion relative to the manner of usage and operation of the instant invention shall be provided.

With respect to the above description then, it is to be realize that the optimum dimensional relationships for the parts of the invention, to include variation in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claim as being new and desired to be protected by Letters Patent of the United States is as follows:

1. An oil drain bag organization comprising, in combination,
a flexible bag body, the flexible bag body defining a cavity therewithin, with the bag body including an elongate neck mounted to the bag body extending upwardly of the bag body terminating in a neck opening, including a mounting means formed in a surrounding relationship to the neck opening defining an upper terminal end of the elongate neck, wherein the mounting means is arranged for securement to a bottom surface of a crank case container, and the flexible bag body includes a valve tube in fluid communication with the cavity adjacent a lower terminal end of the bag body, the valve tube including a valve plug removably mounted from within the valve tube, the valve plug including a flexible tether mounted to the valve plug and the valve tube for securement of the valve plug relative to the valve tube, and a glove bag pouch mounted to the elongate neck and positioned interiorly of the elongate neck and the bag body, the glove bag pouch including an access opening directed through the elongate neck into the glove bag pouch, and the glove bag pouch including a plurality of finger receiving bag members mounted to the glove bag pouch remote from the glove bag pouch access opening for receiving an individual's hand and fingers within the glove bag pouch.

2. An apparatus as set forth in claim 1 wherein the mounting means includes a bag flange directed orthogonally relative to the neck opening exteriorly thereof, including a channel, the channel including securement means therewithin, wherein the securement means are arranged for securement to the bottom surface of the crank case container.

3. An apparatus as set forth in claim 2 wherein the securement means includes a plurality of suction cup members mounted within the bag flange for securement to the bottom surface of the crank case container.

* * * * *